Feb. 6, 1968   W. L. TENNEY   3,367,311
TWO-CYCLE ENGINE EXHAUST SYSTEM
Filed Feb. 16, 1966   4 Sheets-Sheet 1
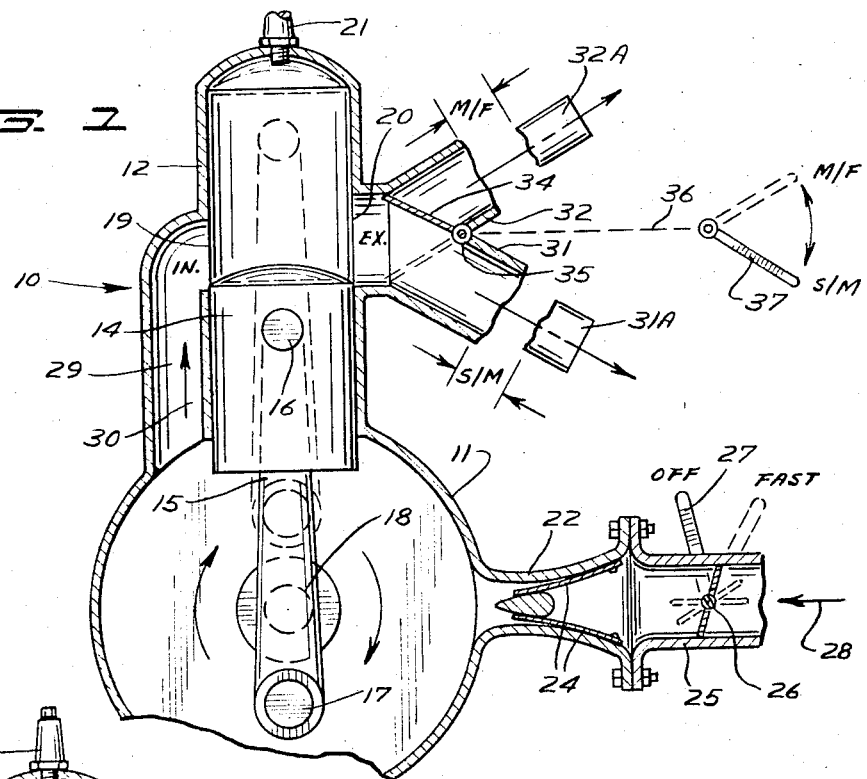
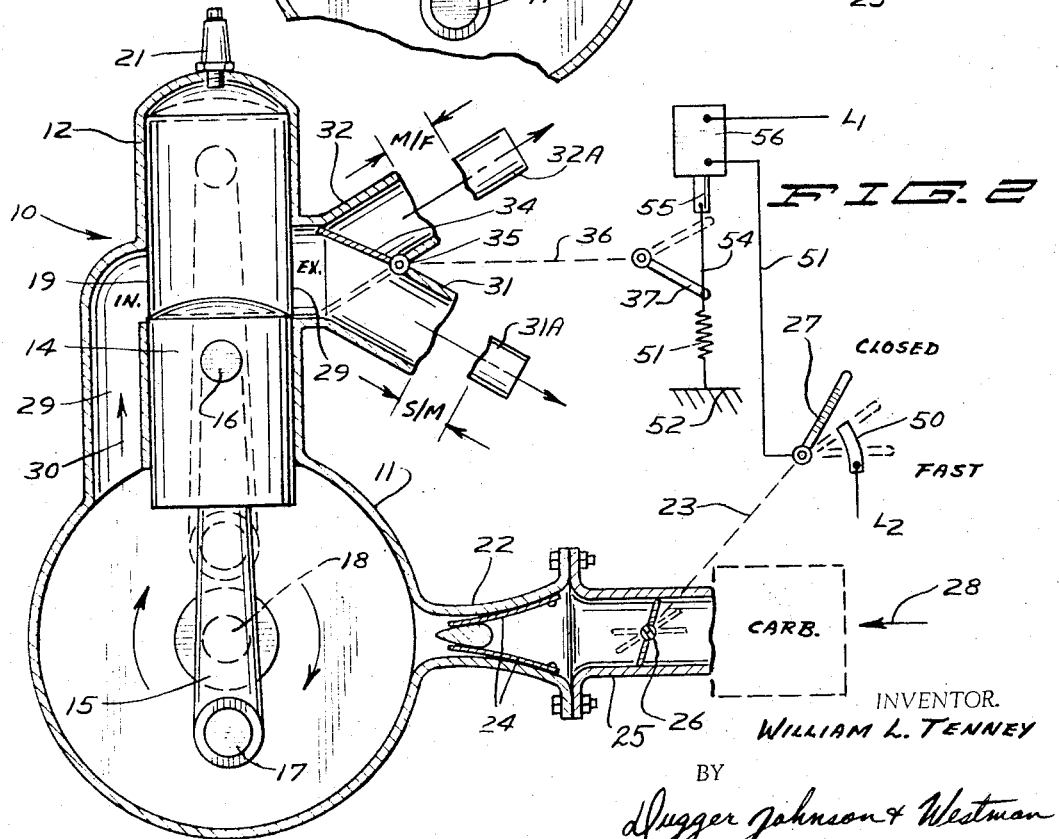
INVENTOR.
WILLIAM L. TENNEY
BY
Dugger Johnson & Westman
ATTORNEYS

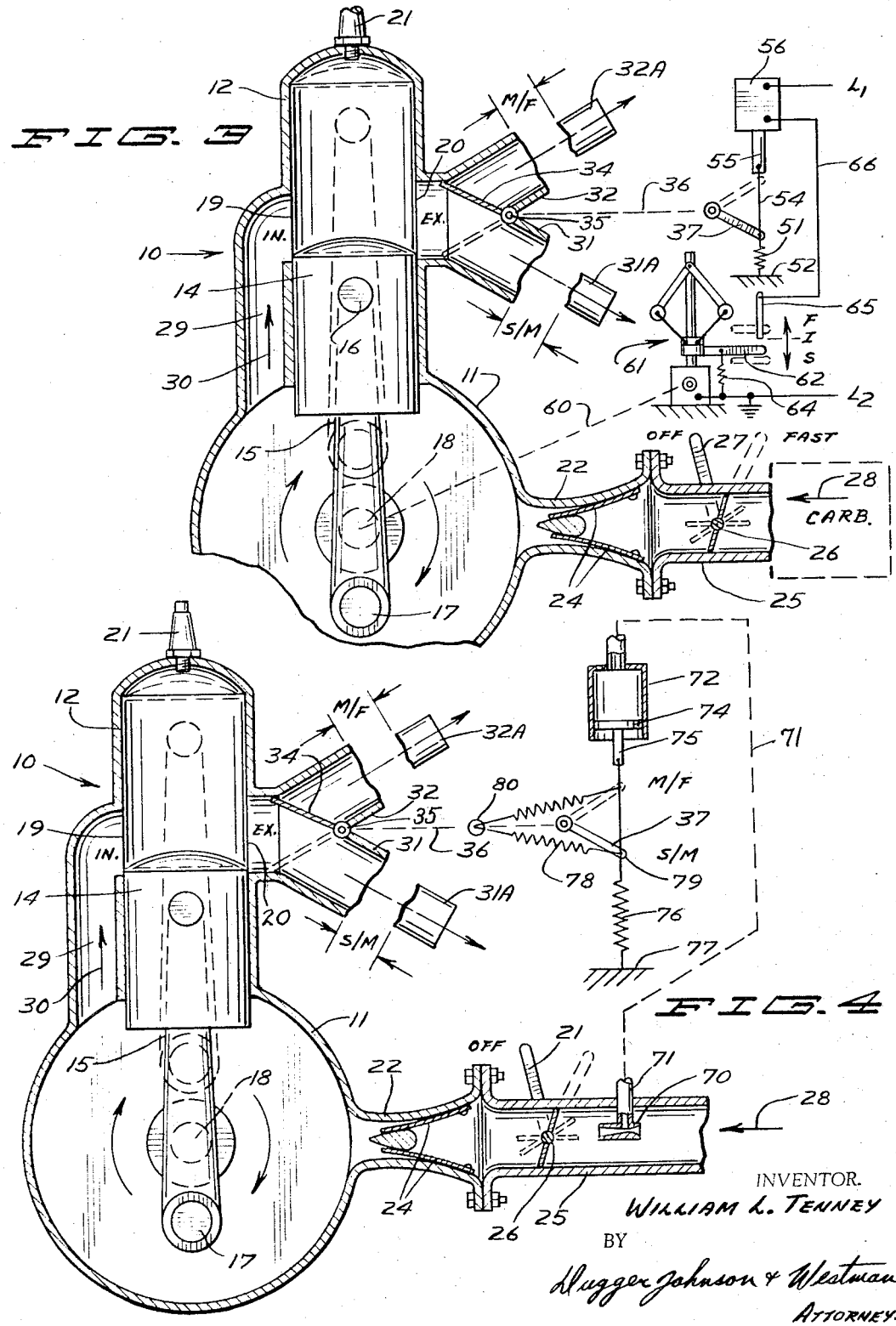

Feb. 6, 1968  W. L. TENNEY  3,367,311
TWO-CYCLE ENGINE EXHAUST SYSTEM
Filed Feb. 16, 1966  4 Sheets-Sheet 3
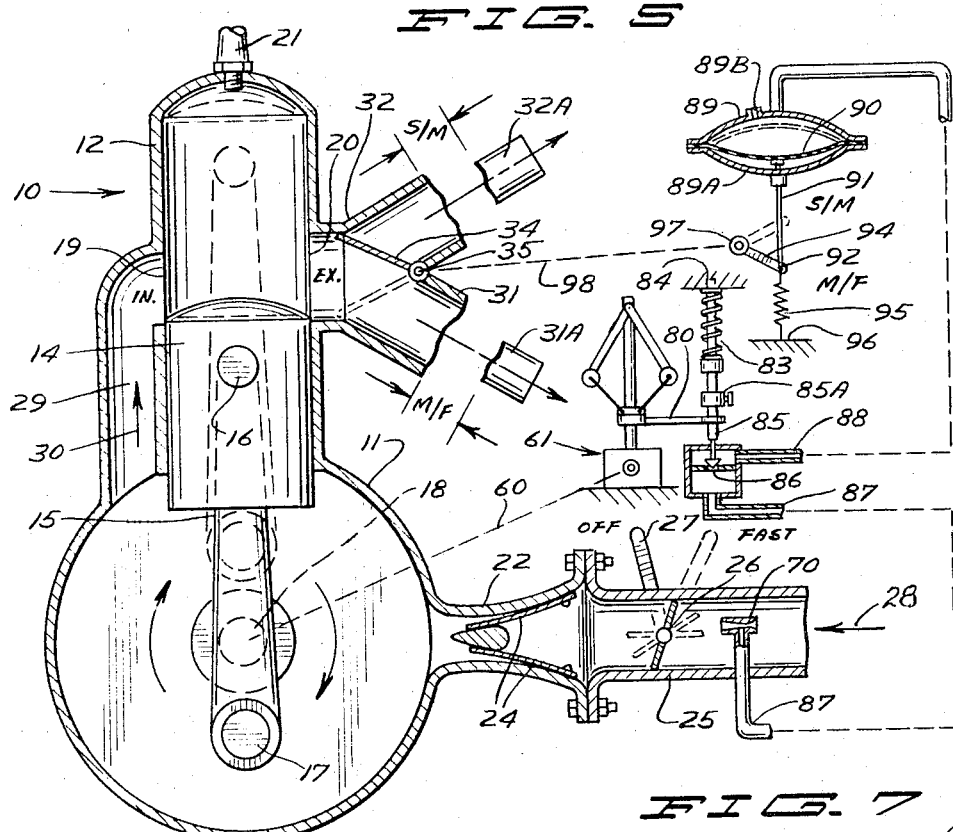
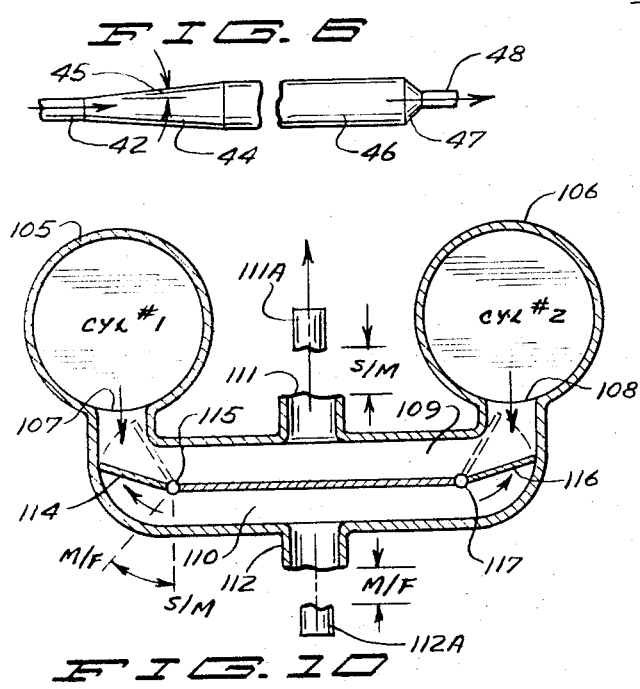
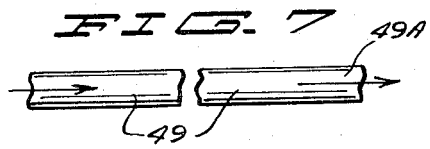
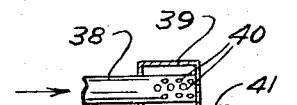
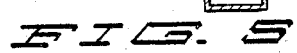
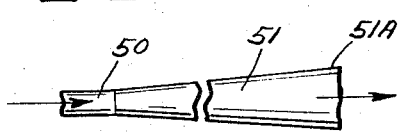
INVENTOR.
WILLIAM L. TENNEY
BY
Dugger Johnson + Westman
ATTORNEYS

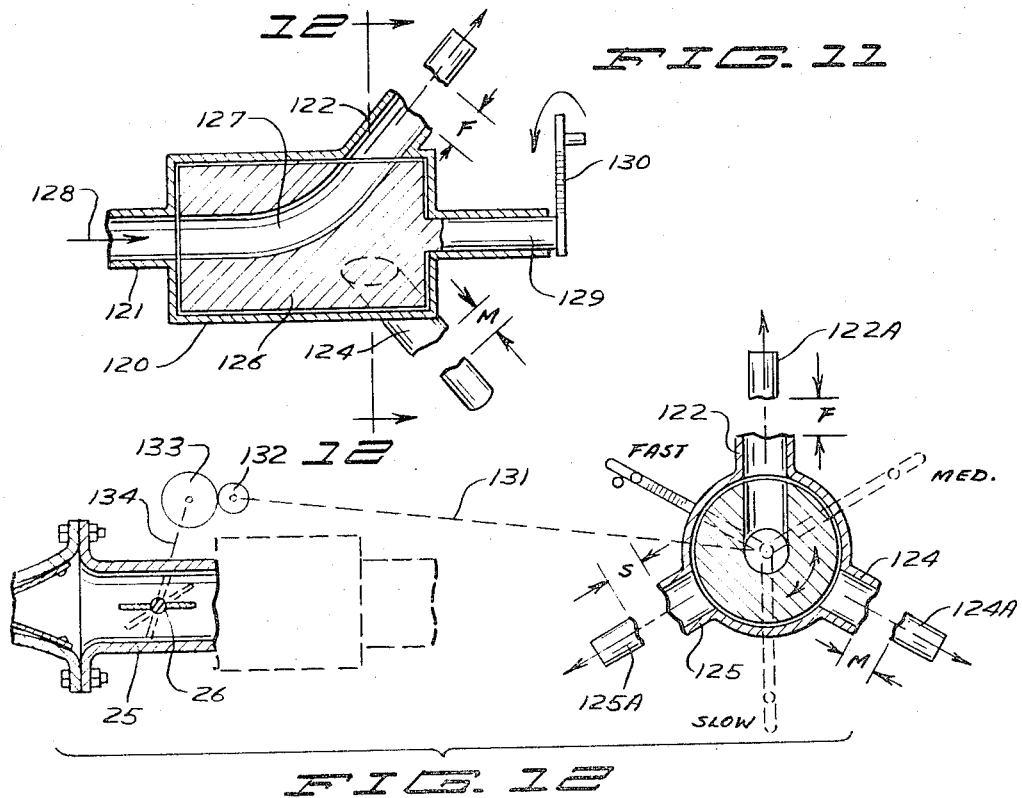
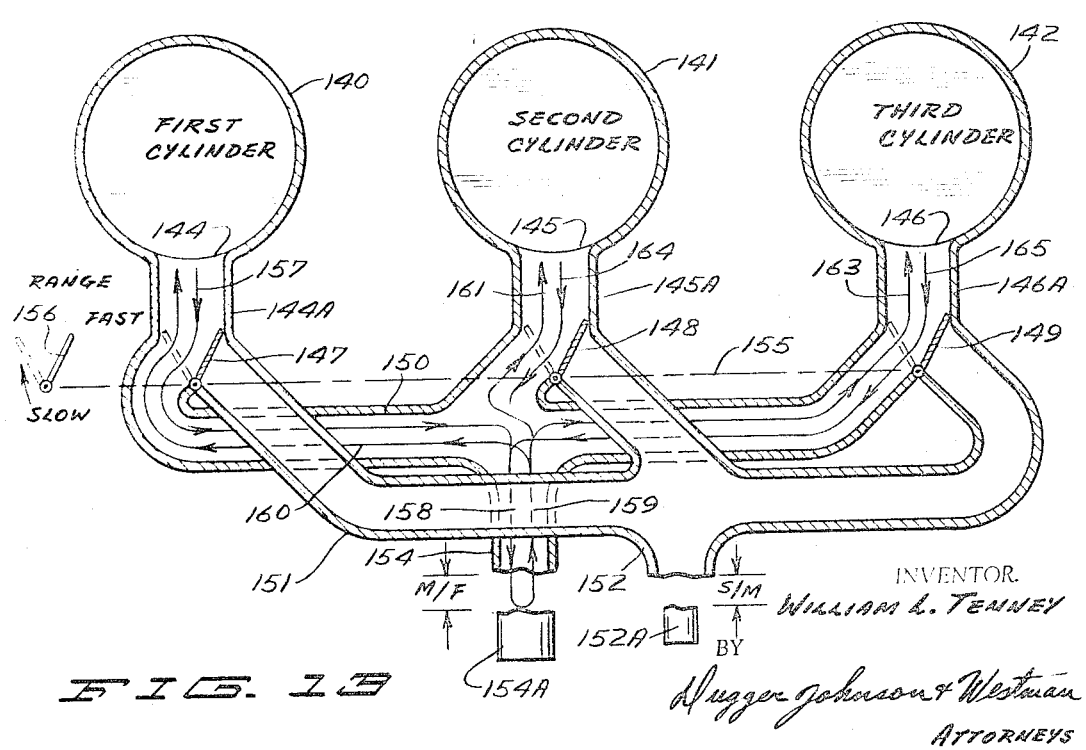

United States Patent Office 3,367,311
Patented Feb. 6, 1968

3,367,311
TWO-CYCLE ENGINE EXHAUST SYSTEM
William L. Tenney, Crystal Bay, Minn. 55323
Filed Feb. 16, 1966, Ser. No. 527,893
14 Claims. (Cl. 123—65)

ABSTRACT OF THE DISCLOSURE

Two-cycle internal combustion engine having a cylinder with an exhaust port, and having two or more exhaust channels selectively connectable to the exhaust port. One (or more) of the exhaust channels are of different configurations and dimensions so as to provide different conditions of resonance in the channels. By selective connection of a particular exhaust channel to the exhaust port, while the engine operates in a certain speed range, the exhaust gases passing from the exhaust port through the selected exhaust channel will be reflected as waves, back toward the exhaust port at a frequency in keeping with the rate (or frequency) of opening of the exhaust port, so that at least a portion of such waves reach the exhaust port while it is open, for improving engine performance. Several embodiments of the invention are illustrated.

---

This invention relates to two-cycle engine exhaust systems.

It is known to provide a two-cycle engine with an exhaust pipe having resonant properties so that at a particular speed or narrow speed range of engine operation, gases traveling through the exhaust pipe will be reflected back into the then still open exhaust port or ports of the engine, and at such particular speed or narrow speed range, to thereby produce a charging effect, which adds to the power output of the engine at said particular speed or narrow speed range. Thus, by use of a so-called "tuned" exhaust pipe, a two-cycle engine may be caused to produce an enhanced power output and generally reduced specific fuel consumption, for a particular speed or narrow speed range, as compared to the power output of the same engine at speeds of operation below and above such speed or speed range. At speeds of operation other than the "tuned" speed range there is generally a disadvantage in power output. For want of more appropriate terminology, in this specification the terms "resonant" or "resonance" and "tuned" are sometimes used in referring to the pulse reflection effect, just referred to.

It is an object of the invention to provide a two-cycle engine and exhaust system having improved power output over a wider speed range and/or for producing enhanced power output of the engine at two or more speeds or speed ranges, and/or in an engine which is already provided with a usual silencing muffler or exhaust pipe design, to provide enhanced power output at one or more speeds or speed ranges.

It is a further object of the invention in a two-cycle engine to provide an exhaust system wherein two or more exhaust mufflers or paths are provided, which are utilized selectively, in accordance with the throttle setting, or in accordance with the speed of the engine or in accordance with another function of the engine which varies in accordance with speed.

It is a further object of the invention to provide a two-cycle engine having a plurality of exhaust pipes, or systems, utilizable selectively in conjunction with the engine.

It is a further object of the invention to provide in a two-cycle engine having more than one cylinder, plural exhaust systems selectively utilizable simultaneously for all cylinders, by means of manual or automatic controls.

Other and further objects are those inherent in the invention herein illustrated, described and claimed and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings wherein FIGURES 1, 2, 3, 4 and 5 are similar vertical views, each mostly in section and partly in elevation, illustrating respectively five different embodiments of the invention.

FIGURES 6, 7 and 8 are side elevational views of exemplary forms of exhaust systems utilizable in the present invention and FIGURE 9 is a longitudinal sectional view of still another form of exhaust system utilizable in the invention.

FIGURE 10 is a horizontal sectional view through a portion of another exemplary form of engine, illustrating a further embodiment of the invention.

FIGURES 11 and 12 illustrate a form of valving arrangement used in connection with certain embodiments of the invention, FIGURE 11 being a longitudinal sectional view through an exemplary form of valve and FIGURE 12 being a schematic view wherein the right hand portion is a transverse section of the valve shown in FIGURE 11, taken along the line and in the direction of arrows 12—12 and at the left portion of FIGURE 12 there is a portion of the engine induction system and throttle thereof.

FIGURE 13 is a horizontal sectional view through an exemplary embodiment of the invention wherein the engine has three cylinders.

Throughout the drawings corresponding numerals refer to the same parts.

In FIGURES 1, 2, 3, 4 and 5 the engine generally designated 10 is, per se, a usual form of two-cycle, crankcase compression, loop-scavenged two-cycle engine wherein the improved exhaust system of the present invention forms an improvement. In the engine 10, the induction of the charge into the cylinder 12 and the escape of the burned charge from the cylinder is accomplished by means of inlet and exhaust ports that are opened and closed by the actuation of the piston 14 in the cylinder, as will later be described. However, insofar as the invention is concerned, it is to be understood that the induction of fresh unburned charge and the escape of the burned charge from the cylinder may be accomplished in diverse ways by poppet valves, for example, and that in the present invention any usual form of two-cycle engines may, per se, constitute the engine portion 10, wherein the exhaust system improvements are embodied. Therefore, the engine components, per se, herein illustrated, are only illustrative and are not a limitation on the invention, since engines of any usual form of two-cycle engine construction will benefit by the invention.

In the illustrations of FIGURES 1-5, the engine 10 has a crankcase 11 and a cylinder 12 wherein the piston 14 moves upwards and downwards by virtue of the action of the connecting rod 15 which is connected at its upper end to the piston at 16 and at its lower end to the crank pin 17. The crank pin 17 is carried on the crankshaft 18, which is journalled for rotation in the crankcase. At the lower portion of the stroke of piston 14, at one side of the cylinder wall there are provided one or several induction ports 19, one being illustrated, and at the other side of the cylinder there are provided one or several exhaust ports 20. The placement and height of the induction and exhaust ports is in accordance with usual two-cycle engine design practice. At the upper end of the cylinder there is a spark plug 21, or fuel injection port if the engine is of the diesel variety. The engine may also have poppet valves for the induction ports or exhaust ports. In some two-cycle engines a uniflow scavenging system may be utilized. Such features of engine construction are per se no part of the invention, it being understood that the two-cycle engine configuration may be varied, and that the type herein illustrated is therefore only exemplary.

Where the crankcase is used for compressing the charge to be induced (as here illustrated), it is provided with a crankcase induction port 22, having check valves 24 therein. The induction port 22 is connected to the induction system 25, containing a throttle 26, which in FIGURE 1 is provided with a handle at 27, so that it may be moved from closed to opened position, for varying the speed of the engine from "off" to "fast." The inflowing charge as illustrated by the arrow 28, may be from a carburetor, or through an aircleaner from the atmosphere, depending upon whether the engine is of the diesel type or is of the carburetor type. At the side of the cylinder are one or more induction passages 19. When the piston 14 descends in the cylinder it compresses the charge in the crankcase, valves 24 then being closed, and as the piston begins to uncover the induction ports 19, the charge compressed within the crankcase flows upwardly through the induction passages 29, as indicated by the arrow 30, and passes through the port(s) 19 into the cylinder 12, above the piston. As the piston ascends it will rise past the openings of the induction and exhaust ports. The induction port 19 will be closed off first, since according to the two-cycle engine design here illustrated, the exhaust port is somewhat higher and opens earlier and closes later. In the normal two-cycle engine some portion of unburned charge will normally pass from the induction port 19 into the cylinder and thence through the cylinder and out through the exhaust port 20, and this movement of unburned charge into the exhaust system is particularly accentuated at certain engine speeds, due to the suction effect of the gaseous charge moving outwardly through an extended exhaust pipe.

According to the present invention the exhaust pipe extending from port 20 is branched so as to provide two or more tubes of which in FIGURES 1–5, two such tubes are illustrated at 31 and 32. At the junction of these tubes there is provided a valve which in FIGURES 1–5 is a two-way valve 34 which is pivoted at 35 so that it can be operated by means, such as the manual control 36–37. Where more than two tubes (31 and 32) are provided the valve will preferably be of another type, such as the three-way (or multi-way) valve illustrated in FIGURES 11 and 12, which will be described later.

According to the present invention the exhaust tubes 31 and 32 (or more, if they are used) are each connected to a different form of exhaust pipe (or muffler). It may be stated parenthetically that the exhaust pipe system, commonly used with internal combustion engines, has for its primary purpose a muffling of the flow of exhaust gases so that undesirable noise is not produced by the engine. One form of muffler of this common type is illustrated in FIGURE 9 and comprises a tube 38 leading into a muffler chamber 39. That portion of the tube 38 within the chamber is provided with apertures at 40, which serve to restrict the flow of exhaust gases to some extent and thereby quiet the flow, and the chamber 39 is then provided with an exhaust outlet as at 41. There are many kinds of "muffler" designs which are for quieting the exhaust impulses from internal combustion engines and any of these forms, of which only one is shown in FIGURE 9, may be utilized for one of the exhaust pipes of the engine in FIGURE 1.

Most "mufflers" used with internal combustion engines will "resonate" to a lesser or greater degree at some engine speed. This fact is utilized in the present invention, where the resonance of muffler is put to advantage. Usually, however, the degree of resonance (or "tuning") decreases as the efficiency of the "muffler" as a silencer increases, until with some mufflers which are very effective silencers, there is almost no resonance at all. Such "efficient" silencing mufflers usually have the undesirable effect of imposing a considerable restriction on the flow of exhaust gases and the "back pressure" in the connection between the engine and muffler is increased.

In FIGURES 6, 7 and 8 there are illustrated various forms of exhaust pipes which are "tuned." In the form shown in FIGURE 6 the tube 42 connects through an expander section 44 which is normally of less than 10° angle (at 45) and then extends through an enlarged section 46 to a restrictor at 47 and thence to an outlet at 48. The length of the entire component from, actually, the engine ports themselves, through the tube 42 to the constriction 47, will be determinative of the frequency of oscillation of the gases in such an exhaust tube, and a tube of particular length will thus be "tuned," be "resonant" at a particular frequency of impulses passing into and through tube 42, and these impulses will pass through the expander 41 and length 46 and be reflected back by the constriction 47 as a reverse pulse traveling towards the incoming end 42.

In FIGURE 7 there is shown a simple tube 49 of uniform length from end to end. This tube will have a certain resonant frequency at which the gases in the tube will vibrate. The same is true for the form shown in FIGURE 8 where the tube has an inlet at 50 which merely expands through an expander section 51 opening to atmosphere. Here again, the tube will have a certain resonant frequency depending upon its length.

According to the present invention for each exhaust tube, as for example, for the two exhaust tubes 31 and 32 of FIGURES 1–5, there are selected different exhaust tubes having different resonant frequencies at which the gases flowing therethrough will resonate. One of the tubes may be replaced by an ordinary silencing type muffler such as shown in FIGURE 9 preferably one having some resonance. Thus, for exhaust pipe 31, in the dimension S/M (meaning "slow to medium"), there is selected, for example, either a silencing muffler such as shown in FIGURE 9, or any other customary type of silencing muffler, or there may be selected one of the tuned forms of exhaust pipes, which can, for example, be any of the forms shown in FIGURE 6, 7 or 8. Such "tuned" exhaust pipe (or muffler) should have a length or configuration such that it would resonate at a lower frequency suitable for "slow to medium" engine speeds. If a silencing "muffler" is selected, it may, and preferably will resonate, at least to some degree, when the engine speed is "slow to medium." For the other exhaust pipe 32, for placement in the dimension M/F, there is selected another exhaust pipe which resonates at a higher frequency appropriate to "medium to fast" engine speeds, and this may also be any of the forms shown in FIGURES 6, 7 and 8, of appropriate configuration to provide resonance at such speed(s).

Thus, as a particular illustration, but without limitation of the invention, the tube 31 would connect directly to the tube 38 of the muffler shown in FIGURE 9 and the tube 41 then becomes the exhaust outlet as at 31A in FIGURE 1 and the tube 32 may be connected to the inlet of any of the forms of mufflers shown in FIGURE 6, 7 or 8, such as the tube 42 of FIGURE 6 or 49 of FIGURE 7 or 50 of FIGURE 8, and in such instance the outlet 32A would constitute the outlet 48 of FIGURE 6 or 49A of the plain tube shown in FIGURE 7 or the outlet end 51A of the expanding type tube shown in FIGURE 8. It is to be understood, of course, that the length of the exhaust pipe is chosen so that it would resonate at the higher (medium to fast) speed of engine as compared to the frequency at which resonance occurs in the muffler provided at S/M of any of the FIGURES 1–5.

In FIGURE 1 the operation of the valve 34 for selecting the exhaust path being used is accomplished manually by means of the control 37 and the speed of the engine is separately controlled manually by means of the control 27. Therefore, in utilizing the engine in FIGURE 1 it is preferable in starting the engine to set the control 37 as shown in the full line position so that the exhaust flow will be directed through the tube 31, and according to the illustration already given, would then pass through the muffler suitable for "slow to medium" engine speed, as for example, the muffler of FIGURE 9. The engine is then started and brought up to a particular speed. As the speed is increased by the adjustment of the throttle 27, the exhaust pipe 32 may be put into operation by moving the control 37 to the solid line position, and the flow then would occur through the exhaust pipe connected to the tube 32, which as explained above, may be any of the forms shown in FIGURE 6, 7 or 8, of shape and configuration so as to provide resonance at medium to fast engine speeds. As a result, the engine "speed vs. power" performance curve will show a smooth rise and may "peak" to some degree in the slow to medium range, depending upon the degree of resonance of the muffler at S/M connected to pipe 31, and as the speed is increased (by manipulation of control 37) the speed vs. power curve will "peak" again in the medium to fast speed range. This provides an improved, overall speed vs. power performance which is quite advantageous.

In FIGURE 2 the engine and exhaust system and the induction system are as shown in FIGURE 1, but in this the throttle 26 for the engine, which is controlled manually by means of the lever 27, is provided with an electrical switch quadrant 50 adjacent lever 27. The valve 34 is connected through the shaft 36 and to the lever operator 37 on the shaft normally held in its full line position by means of a spring 51 attached to frame 52. However, the lever 37 is arranged to be drawn upwardly by the link 54 attached to the core 55 of solenoid 56. The power supply at line L1 is connection to the solenoid coil and hence through line 51 to throttle control lever 27, and the quadrant switch 50 is connected to line L2. Accordingly, when the engine 10 is not operating, and the valve 27 is closed, the spring 51 will hold the lever 37 in its full line position and hence hold the valve 34 in its full line position so that the exhaust flow from the engine 10, when it is started, will flow through the tube 31 and thence through the exhaust connected thereto in the dimension S/M which is resonant at or appropriate to slow to medium engine speeds and thence out through the exhaust tube 31A. This condition appropriate for slow to medium speeds is accordingly available for all settings of the throttle lever from the closed condition of the throttle, as illustrated, up until the lever reaches the setting for a certain intermediate speed which occurs just as the lever 27 makes contact with the end of the quadrant 50, and at this time, which is at an intermediate speed throttle setting for the engine, a circuit is established for solenoid 56, and it draws the lever 37 upwardly to its dotted line position thus moving the valve 34 to its dotted line position, so as to transfer the exhaust flow to the tube 32 and out through the muffler which is placed at the dimension M/F, and through the exhaust tube 32A. Thus as the engine speed is increased from slow to medium speeds, the exhaust flow is first through an exhaust pipe which has a resonant frequency appropriate to lower speeds of operation of the engine, or there may be provided a silencing muffler which is appropriate in the slow to medium speed range and may have some resonance at speeds in the slow to medium range. But as the speed of the engine is increased, due to the opening of the throttle 27, the exhaust flow is transferred to the tube 32 and hence passes through an exhaust pipe having a resonant frequency appropriate to medium to fast speed(s) of the engine. Thus in FIGURE 2, the manipulation of the valve 34 for selection of the exhaust path appropriate to the speed of the engine, is made dependent by virtue of the setting of throttle 27.

In FIGURE 3, as in FIGURES 1 and 2, the exhaust pipe (or muffler) which is interposed at the dimension S/M between the pipes 31 and 31A is appropriate to slow-medium speeds of operation of the engine 10, and can either be a muffler as in FIGURE 9, or an exhaust pipe such as shown in FIGURES 6–8, having a dimension and shape, for best operation in the slow to medium engine speed range. The pipe that is provided at dimension M/F has a resonance, i.e. is "tuned" at higher frequencies of operation, appropriate to higher engine speeds.

In FIGURE 3, the manipulation of valve 34 is accomplished as in FIGURE 2, by means of the operation of a relay, in this instance a solenoid 56, which, through the movement of its core 55, attached at 54 to the lever 37, will move said lever from its normal position shown in full lines, where it is held by the spring 51, to the dotted line position, when the solenoid is operated, thus correspondingly moving the valve 34 from its full to its dotted line position, as shown in FIGURE 3. The speed of the engine in FIGURE 3 is controlled by the manipulation of the throttle lever 27. The actuation of the solenoid 56 is, however, controlled by means responsive to the speed of the engine. Thus from the crankshaft 18 there extends an appropriate mechanical connection at 60 leading to the governor generally designated 61, which can be of any conventional design. The governor is provided with a switch contact at 62, which is connected by means of a flexible connection 64 to line L2, this line also being grounded to the engine. When the governor 62 is at rest, the contact 62 is in its lowermost position, as shown in dotted lines, opposite the position legend S. The contact 62 will, however, be elevated gradually in accordance with engine speed, and at an intermediate speed position designated I, engages a fixed contact strip 65 which is connected by line 66 through the coil of the solenoid 56 and thence to line L1. Accordingly as the engine speed is increased, the governor 61 will gradually elevate the contact 62 until, upon engagement with the lower end of the fixed contact strip 56, a circuit will be established from line L1 through the solenoid 56 and thence through the line 66, contacts 65 and 62, connector 64, and thence to line L2. Therefore, as the engine speed increases, solenoid 56 is energized and when this occurs it pulls the lever 37 upwardly and moves the valve 34 from its full to its dotted line position, and when this occurs the exhaust flow from the engine is transferred from the pipe 31 to the pipe 32. Therefore, for all engine speeds from slow to medium, i.e. "intermediate" speed I, the exhaust flow is through the pipe 31, and through an exhaust pipe or muffler interposed at the dimension S/M and thence out through the pipe 31A. The pipe (or muffler) is selected so as to be appropriate at a lower frequency of operation so as to be best for slow to medium speeds of operation of the engine 10. However, as the engine speed is increased, and the contact 62 engages the lower end of the strip 65, solenoid 56 is operated and the exhaust flow is transferred by means of the valve 34 to the pipe 32 and thence passes through the exhaust pipe interposed at the dimension F/M and out through the pipe 32A, and at such higher engine speeds the exhaust flow is thence through an exhaust pipe having a resonance at a higher frequency of operation, appropriate to the higher speed of operation of the engine 10.

In FIGURE 4 the system is similar to that shown in FIGURE 3 except that in lieu of a speed control switch and the electrical relay (solenoid) for operating the valve 34, there is provided a system which is actuated by means of pressure (negative pressure) induced in the intake system of the engine 10, and this is utilized for operating the valve 34. Thus in the tube 25, there is placed a small venturi 70 which is connected by a tube 71 leading to the cylinder 72 which has piston 74 movable therein. The piston rod 75 is connected to the lever 37, which is normally drawn downwardly by means of spring 76 attached to the frame 77. The lever 37 is also provided with a spring 78 attached at 79 to the lever and to the framework at 80. This spring serves as an overcenter spring, so as to maintain the lever 37 in either the full or the dotted line positions as shown in FIGURE 5. The lever 37 is, of course, connected by the shaft 36 to the valve 34 so that when the lever 37 is in the full line position the valve 34 will be in its full line position appropriate to slow to medium engine speeds. As in the previous illustrations of the invention the muffler (or exhaust pipe) inserted at the dimension S/M is appropriate to slow to medium speed(s) of operation of the engine 10 whereas the muffler provided at dimension M/F has a higher frequency of resonance, appropriate to medium to high speed(s) of operation of the engine 10, all as previously described.

Assuming that the throttle 26 is in the off position and the engine is at rest, the operator first moves the lever 37 to position designated S/M (if it is not already at such position) and the overcenter spring 78 will then maintain the lever 37 in such position, which is shown in full lines in FIGURE 4 and through the shaft 36 the valve 34 is then held in its full line position, preparatory to directing exhaust flow to the tube 31 and muffler interposed at the dimension S/M and out through the tube 31A. The engine is then started, by partially opening the throttle valve 27 according to usual starting procedure. As the engine starts, some vacuum is produced at venturi 70 and the vacuum will increase as the engine speed increases. This vacuum is applied via tube 71 to the piston 74 and will tend to pull the piston upward. As the throttle valve 27 is opened wider, the vacuum supplied by venturi 70 will increase and the upward pull supplied by piston 74 will also increase until at a certain intermediate (medium) speed the pull will overpower spring 76 and then the lever 37 upwardly by a quick motion to its dotted line position where it is held by the overcenter spring 78. When this occurs the valve 34 is moved to its dotted line position and the exhaust flow is then directed through the tube 32 and out through the muffler interposed at the dimension M/F and then through the tube 32, said muffler or pipe having a higher resonant frequency appropriate to the then medium to fast speed(s) of operation of the engine 10.

In FIGURE 5 the arrangement of engines and exhaust pipes is as illustrated with reference to FIGURES 1–4. The control of the exhaust flow is by means of the valve 34, which is operated by the shaft 98, and when the valve is in the full line position as illustrated the exhaust flow is through the pipe 31, appropriate to slow to medium engine speeds, and when the valve 34 is in the dotted line position the exhaust flow is through the pipe 32 appropriate to medium to fast engine speeds. The crankshaft 18 is connected by the shaft 60 to the governor 61, as in FIGURE 3 but in this instance the governor is provided with a sidearm 80, the outer end of which is apertured so as to receive valve stem 85 on which it freely slides up and down. The stem 85 has a collar 85A which is held on the stem by a set screw so its position can be adjusted. When the governor, and hence the arm 80, is in a position appropriate to medium to slow speeds the arm 80 is below collar 85A and the stem is urged down by spring 83 which rests on frame 84 and the lower end of the valve stem seats on and closes the port 86 in the valve seat. As in FIGURE 4, a small venturi is provided at 70, and this is connected by the tube 87 to the chamber below port 86. When the engine speeds up negative pressure is increased and is then communicated through tube 87 to valve 85–86, which however, remains closed until the engine reaches an intermediate speed such that arm 80 engages the collar 85A and lifts valve stem 85. Then the vacuum is communicated through port 86 and tube 88 to the upper side of flexible diaphragm 90 in the vacuum actuator (relay) 89. The diaphragm has a stem 91 extending downwardly through the lower portion 89A of the vacuum actuator (relay), and the lower end is pivotally attached at 92 to the lever arm 94. At the pivot connection 92 there is also provided a spring 95 which is attached to the frame at 96, so that the lever arm 94 is normally pulled downwardly by the spring. But vacuum is applied to the diaphragm 90 as described, and the force is sufficient to flex the diaphragm upwardly against the action of the spring 95, thus swinging the lever 94 to its dotted line position and this moves valve 34 from its full to its dotted line position. It will be noted that the casing of the vacuum actuator (relay) is provided with a small port at 89B through which a small leakage flow of air into the upper portion of the casing above the diaphragm 90 is permitted. This port provides a constant slight inward leakage of air to relieve pressure on the diaphragm, when the engine is operating at slow speeds or is not operating, and hence when valve 85–86 is closed there is normally insufficient upward pull on diaphragm 90 to overcome spring 95. When valve 85–86 is open there is sufficient vacuum applied so that the slight leakage inflow at port 89B will not decrease the vacuum appreciably and the diaphragm 90 will be fixed upwardly. Under nonoperating conditions arm 80 is well below collar 85A, valve 85–86 is closed, inflow of air at 89B has equalized pressure on diaphragm 90, spring 95 has pulled arm 94 downwardly and valve 34 is therefore in the full line position to direct exhaust flow to pipe 31 through exhaust pipe (or muffler) S/M appropriate to slow to medium engine speeds. To start the engine the throttle 27 is moved from the "off" to an intermediate position appropriate for starting and the engine is started. When this occurs a negative pressure is induced by venturi 70 and is communicated via pipe 87 and is applied to valve 85–86 which is then closed. The engine starts and runs at a slow to medium speed and the flow of exhaust gases passes through the pipe 31 and through the S/M pipe (or muffler), having a characteristic appropriate to the slow-medium speeds of operation of the engine 10. As the throttle valve 27 is opened to a certain intermediate speed or opened to the fast speed position, the vacuum provided at venturi 70 increases but is not utilized until valve 85–86 opens. As the governor 61 rotates at higher speeds, the side arm 80 is moved upwardly, engages collar 85A (the position of which on stem 85, may be adjusted), and at a certain speed the stem 81 is moved upwardly against the spring 83, thus opening the valve 85–86 so as to communicate the vacuum via pipe 88 to the upper side of the diaphragm 90. The slight air leakage inwardly up the orifice 89B is not sufficient, seriously to reduce the vacuum applied to the diaphragm 90 and it is accordingly pulled upwardly against the action of the spring 95, and this moves the lever 94 to its full line position, and the valve 34 is then moved to its full line position and directs the exhaust flow through the pipe 32 and through the pipe (or muffler) interposed at M/F, having a resonant frequency appropriate to medium-fast engine speeds of operation.

In FIGURE 10 there is illustrated the manner in which the invention may be utilized in an engine having two (or generally, several) cylinders. In this instance the cylinders 105 and 106 are provided with exhaust ports 107 and 108 respectively. There are also provided two exhaust manifolds at 109 and 110. The manifold 109 is provided with an exhaust pipe 111 which terminates at 111A and in the dimension S/M there may be interposed a silencing muffler having, if desired, a characteristic appropriate to lower speeds of operation of the engine, or an exhaust pipe, having a lower frequency resonance, appropriate to said slow-medium engine speeds. The exhaust manifold 110 is provided with an exhaust pipe at 112 terminating at 112A and at the dimension M/F there is placed an exhaust muffler or exhaust pipe having a higher resonant frequency appropriate to higher speeds of operation of the engine. The flow of exhaust gases from the ports 107 and 108 to either manifold 109 or manifold 110 is controlled by means of the valve 114 which is pivoted at 115 for the exhaust port 107 and the valve 116 which is pivoted at 117, for the exhaust port 108. The valves 115 and 116 are manipulated by an appropriate interconnected linkage, not illustrated, so that they may simultaneously be moved to their full line positions, as illustrated, for directing the exhaust flows of the exhaust ports 107 and 108 simultaneously into opposite ends of the manifold 109 and thence outwardly through the tube 111 and the exhaust muffler at S/M and tube 111A to atmosphere, or the valves 114 and 116 may be moved simultaneously by said appropriate linkage to their dotted line conditions where the exhaust flows from the ports 107 and 108 simultaneously into opposite ends of the manifold 110 and thence outwardly through the exhaust pipe 112 and exhaust tube at M/F and through the tube 112A to atmosphere. Thus, in a multi-cylinder engine, for utilizing the invention there is provided as many exhaust manifolds as there are exhaust tubes for the whole engine, and where there are thus two exhaust tubes, two such manifolds are provided as at 109 and 110 for FIGURE 10 and an appropriate valve mechanism provided at each exhaust port for simultaneously directing the flow of the exhaust gases from the exhaust ports of the cylinders into one or the other of the exhaust manifolds and then through the selected manifold to its exhaust pipe. If there are three exhaust pipes or systems, then three manifolds are provided and three-way selector valves as in FIGURES 11–12 are used at the exhaust port of each cylinder.

Referring to FIGURES 11 and 12, there is illustrated a type of valve mechanism for the present invention, which may be used when three or more exhaust mufflers or pipes are to be used selectively, three being illustrated in FIGURES 11–12. The valve (which is used at each cylinder exhaust) consists of a valve body 120 having an inlet 121 which connects to the exhaust port of the cylinder of the engine. Where there are multiple cylinders a valve such as in FIGURES 11–12 is provided at the exhaust port of each of the cylinders of the engine. The valve casing 120 is provided with a plurality of outlets, three such outlets at 122, 124 and 125 being illustrated in these figures. Within the valve casing 120 there is a rotatable valve element 125 having a curved channel 127, which receives the inflow of exhaust gases from the engine cylinder via the arrow 128, which comes through the inlet 121, and then depending on the position of valve rotor 126, the flow is passed out through one or the other of the ports in the casing 120 from which pipes 122, 124 and 125 extend. The valve element 126 is provided with a stem 129 by which it can be rotated by a manual crank 130 or by means of any other suitable mechanism. In FIGURE 12, which is partly schematic, the stem 129 is illustrated as connected by means of a shaft 131 and gears 132–133 to the shaft 134 which connects to the throttle 26 in the intake manifold 25 of the engine. Since the valve element 126 will rotate through approximately 240°, in moving from the "slow" through the "medium" to the "fast" positions, as shown in FIGURE 12, and since the throttle valve 26 moves through something less than 90° from the "closed" to the "open" position, the gearing 132–133 is made appropriate so that when the valve element 126 is in the "slow" position of the exhaust system the engine throttle 26 will likewise be in the "slow" (nearly closed) position and when the valve element 126 is moved to the "medium" speed position for the exhaust system the engine throttle 26 is likewise moved to a "medium" speed position for the engine and when the valve element 26 is moved to the "fast" position for the exhaust system of the engine, the engine throttle 26 is likewise moved to the "full open" position for fast engine speeds. It will be understood that in FIGURE 12, three exhaust pipes (or mufflers) are provided at the dimensions S, M and F or, for multiple cylinder engines, the tubes 125 (for S), 124 (for M) and 122 (for F) are connected to manifolds which lead into said S, M and F exhaust pipes (or mufflers). These exhaust pipes (or mufflers) S, M and F have characteristics of operation suitable respectively for "slow," "medium" and "fast" engine speeds. These can be selected from the various types shown in FIGURES 6–9, as previously described. It will be borne in mind that when a manifold and exhaust pipe are combined, as in a multiple cylinder engine, the dimensions of the combination, i.e. of the pipe (or muffler) plus the manifold will be determinative of the characteristic operating frequency.

Referring now to FIGURE 13, there is illustrated the manner in which the invention is applied to a two-cycle three cylinder engine wherein the pistons and cranks are set at 120°. For applying the invention to such an invention, there may be provided two or more exhaust manifolds, two being illustrated in FIGURE 13. Thus, in FIGURE 13, there are illustrated the cylinders 140, 141 and 142 provided respectively with exhaust ports 144, 145 and 146. These exhaust ports lead respectively to the exhaust tubes 144A, 145A and 146A which, at the valves 147, 148 and 149 respectively, lead into two exhaust manifolds 150 and 151. The exhaust manifolds are each provided with an exhaust tube. Thus manifold 151 is provided with an exhaust tube at 152 which can, in some designs, be merely an outlet pipe, but where provision is made where appropriate for connecting in an exhaust pipe (or muffler) having a resonant frequency suitable for slow-medium speeds of operation of the engine with the exhaust outlet at 152A. The manifold 150 is similarly provided with an exhaust tube 154 where provision is made for connecting in an exhaust pipe (or muffler) having a resonant frequency appropriate for medium-fast engine speeds of operation, and has an exhaust opening 154A. All of the valves 147, 148 and 149 are pivoted, and by a suitable mechanical linkage 155–156 may be simultaneously swung to their full line positions, illustrated so as to direct the flow of exhaust gases from the cylinders 140–142 through pipes 144A–146A to the exhaust manifold 150, and thence through the tube 154 and the exhaust pipe (or muffler) M/F, which (with manifold 150) has a resonant frequency appropriate to medium-fast engine speeds of operation and thence to atmosphere at 154A, or they may be simultaneously swung to their dotted line positions, where the exhaust flow from each of the cylinders is directed into the exhaust manifold 151 and thence flows through the tube 152 and out through the exhaust pipe (or muffler) S/M, which (with manifold 151) has a characteristic frequency appropriate to slow-medium engine speeds of engine operation, and the exhaust flows thence to atmosphere at 152A. Since the path of flow includes the distance within the manifold 151, the pipe S/M and outlet 152A can in some instances be merely an outlet, or can be shorter than where the distances of travel of the exhaust gases through a manifold, need not be considered (as in single cylinder engines). It will be appreciated that since the piston moving in the cylinders 140–142, for a three cylinder engine, are operated at 120° angular positions, that the exhaust ports 144, 145 and 146 will not all be open at the same time, but the openings will occur on a time basis determined by the crank throw. Consequently, when a pulse of exhaust gases flows out from cylinder 140, for example, as shown by the arrow 157, this pulse of exhaust flow will pass downwardly into the manifold 150 and thence pass via the arrow 158 outwardly through such length of pipe 154 as is included, and after passing into and through the length of the exhaust pipe (or muffler) at M/F, the pulse will be reflected as at 159, and this reflected pulse will then be driven back into the exhaust manifold 150, through which it will be impressed upon each of the tubes 144A, 145A and 146A. This return pulse, via the arrow 159, therefore divides and will pass along the paths shown by arrows 160 for cylinder 140, 161 for cylinder 141 and 163 for cylinder 142. But since the pulse emanating from one cylinder will not necessarily find the exahust ports of other cylinders simultaneously open at least throughout the same period that the exhaust port is open in the cylinder which formed the pulse, it follows that the return pulse is driven back to any available open exhaust port. Again, it may be stated that the distance of pulse travel within the manifold 150 is in some instances sufficient, in itself to provide for the reflective principle and in such case the length of pulse travel provided by tube 154 and pipe M/F may be disregarded, in which event pipe 154 is merely the exhaust outlet. Depending upon the height of the exhaust ports in a particular engine design, the length of the manifold and associated piping and other design factors, there may be some overlapping in the time that the exhaust ports 144-146 are open and thus one cylinder many reflect a pulse to another.

Each of the cylinders 140, 141 and 142 will produce its exhaust pulse, thus cylinder 140, as described, produces the pulse 157 while cylinder 141 will produce the pulse 164 and cylinder 142 will produce the pulse 165, and each of these pulses of exhaust gases, emanating from its cylinder as the exhaust ports of the cylinder are opened, will be driven out through the manifold 150 and thence out through the tube 154 and exhaust pipe (or muffler) at M/F and reflected back, at a time spacing which depends upon the resonant frequency of the manifold-exhaust pipe (or muffler) combination. Whether the pulse is reflected entirely to the cylinder which initiated the pulse, or partially to another cylinder will depend upon the number of cylinders in the engine, and the angular spacing of the crank throws, the height of the exhaust ports and the physical dimensions of the manifold-exhaust pipe paths. The invention may be thus applied to multi-cylinder two-cycle engines, with good advantage.

As many widely apparently different embodiments of this invention may be made without departing from the spirit and scope thereof, it is to be understood that I do not limit myself to the specific embodiments disclosed herein.

What is claimed is:

1. In a two-cycle internal combustion engine having a cylinder with a piston movable to and fro therein, an exhaust port in the cylinder which is opened and closed by engine operation, two or more exhaust channels leading from the exhaust port, exhaust channel valve means at the exhaust port for selectively connecting said exhaust channels one at a time to the exhaust port, said exhaust channels being so shaped and dimensioned as to have different natural frequencies of vibration of the gases moving therethrough the natural frequency of vibration of at least one of said channels being such that by using such channel when the engine is operating in a certain speed range, the pulsing flow of gases passing from the exhaust port through such channel will resonate and be reflected as pressure waves back toward the exhaust port at a frequency such that at least a high pressure portion of such waves reaches the exhaust port while it is open to reduce the net amount of unburned charge that may be passed into such channel.

2. The engine specified in claim 1 further characterized in that one of said exhaust channels has a natural frequency of vibration over a relatively narrow range and another of said exhaust channels is a primarily silencing muffler.

3. The engine specified in claim 1 further characterized in that the engine has a manually controlled throttle and said exhaust channel valve means is manually controlled independently of said throttle.

4. The engine specified in claim 1 further characterized in that the engine has a manually controlled throttle valve which is connected to said exhaust channel valve means so as to be moved in coordination therewith.

5. The engine specified in claim 4 further characterized in that the exhaust channel valve means is connected to said throttle by means of relay actuated in accordance with throttle movement.

6. The engine specified in claim 1 further characterized in that the engine has suction means associated with the engine intake for providing a suction source and suction operated means is provided connected to said suction source for operating the exhaust channel valve means.

7. The engine specified in claim 1 further characterized in that a relay is connected to the exhaust channel valve means for operating it, and means responsive to the speed of the engine is provided for actuating said relay for thereby changing the position of the exhaust channel valve means in response to engine speed.

8. The engine specified in claim 7 further characterized in that the relay is fluid pressure operated.

9. The engine specified in claim 7 further characterized in that the relay is electrically operated.

10. The engine specified in claim 1 further characterized in that the engine has a plurality of cylinders each provided with an exhaust channel valve means, said exhaust channel valve means being connected together so as to be simultaneously operable by a common control.

11. The engine specified in claim 1 further characterized in that the exhaust channel valve means is a swingable vane valve.

12. The engine specified in claim 1 further characterized in that exhaust channel valve means is a rotary valve.

13. The engine specified in claim 1 further characterized in that the engine is a multi-cylinder engine and has as many manifolds as exhaust channels with an exhaust outlet leading from each manifold, each exhaust manifold with its exhaust outlet having a different natural frequency of vibration of gases moving therethrough, each cylinder having an exhaust channel valve means for selectively channeling the flow of exhaust gases into one or another of said manifolds for flow through said manifolds and the exhaust channel connected thereto, said exhaust channel valve means of all cylinders being connected together for simultaneous operation.

14. The engine specified in claim 13 further characterized in that the engine has three cylinders.

References Cited

UNITED STATES PATENTS

| 1,490,957 | 4/1924 | Birger | 60—32 |
| 1,593,923 | 7/1926 | Wiest | 60—32 |
| 1,860,569 | 5/1932 | Bourne | 60—32 |
| 2,488,563 | 11/1949 | Sills | 123—119 |
| 2,717,583 | 9/1955 | Maybach et al. | 123—65 |

FOREIGN PATENTS 431,856  7/1935  Great Britain.

WENDELL E. BURNS, *Primary Examiner.*